(12) United States Patent
Blaney et al.

(10) Patent No.: US 6,190,602 B1
(45) Date of Patent: Feb. 20, 2001

(54) METHOD OF MANUFACTURING A PERFORATED LAMINATE

(75) Inventors: Eric Blaney, Maynard; Thomas M. Fusco, Medford; Glenn A. Freitas, Foxboro; David Rich, Dedham, all of MA (US)

(73) Assignee: Aztex, Inc., Waltham, MA (US)

(*) Notice: Under 35 U.S.C. 154(b), the term of this patent shall be extended for 0 days.

(21) Appl. No.: 09/243,723

(22) Filed: Feb. 3, 1999

Related U.S. Application Data

(63) Continuation-in-part of application No. 09/039,170, filed on Mar. 13, 1998, now abandoned.

(51) Int. Cl.⁷ .................................................... B24B 1/04
(52) U.S. Cl. ................. 264/443; 264/156; 156/303.1; 425/290; 425/DIG. 37; 83/660; 83/698.42
(58) Field of Search ................................ 264/154, 156, 264/442, 443; 156/303.1; 425/290, DIG. 37; 83/660, 698.42

(56) References Cited

U.S. PATENT DOCUMENTS

| | | |
|---|---|---|
| 2,244,550 | 6/1941 | Chandler . |
| 3,440,117 | 4/1969 | Soloff et al. . |
| 3,683,736 | 8/1972 | Loose . |
| 3,704,194 * | 11/1972 | Harrier ................................ 156/245 |
| 3,719,736 | 3/1973 | Woodruff . |
| 3,787,546 * | 1/1974 | Pratt et al. ............................ 264/156 |
| 4,160,055 | 7/1979 | Reed . |
| 4,390,584 | 6/1983 | Briens . |
| 4,486,372 | 12/1984 | Millard et al. . |
| 4,541,879 | 9/1985 | Riel . |
| 4,612,737 | 9/1986 | Adee et al. . |
| 4,696,711 | 9/1987 | Greszczuk . |
| 4,747,895 | 5/1988 | Wallerstein et al. . |
| 5,252,279 | 10/1993 | Gore et al. . |
| 5,268,055 | 12/1993 | Bales et al. . |
| 5,419,865 | 5/1995 | Ogata et al. . |
| 5,589,015 | 12/1996 | Fusco et al. . |
| 5,741,574 | 4/1998 | Boyce et al. . |
| 5,827,460 * | 10/1998 | Brentrup et al. ................. 264/171.23 |

FOREIGN PATENT DOCUMENTS

93/22128 * 11/1993 (WO) .................................. 264/156

* cited by examiner

Primary Examiner—Jan H. Silbaugh
Assistant Examiner—Stefan Staicovici
(74) Attorney, Agent, or Firm—Iandiorio & Teska

(57) ABSTRACT

A method of making a perforated laminate wherein a pliable perforation device having plurality of holes and plurality of perforation pins in the holes is assembled on a laminate; the pins are driven through the uncured laminate to perforate the laminate; the laminate is then staged or cured with pins in place; and the pins are then removed from the cured laminate and pushed back into the perforation device for reuse thereof.

12 Claims, 6 Drawing Sheets

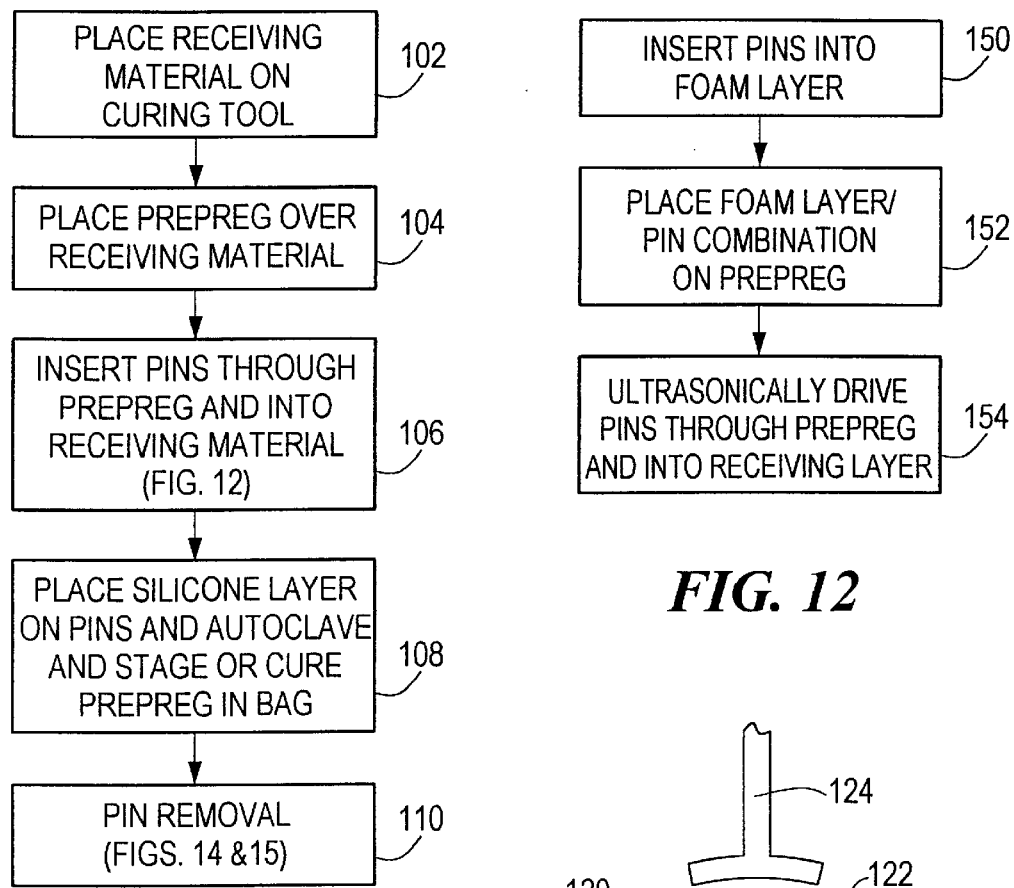
*FIG. 10*
*FIG. 12*
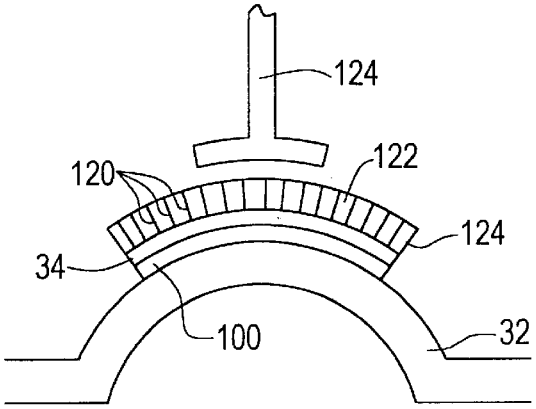
*FIG. 13*
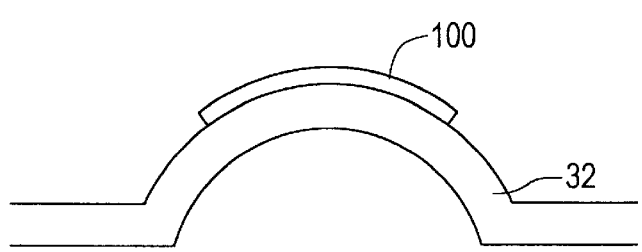
*FIG. 11*

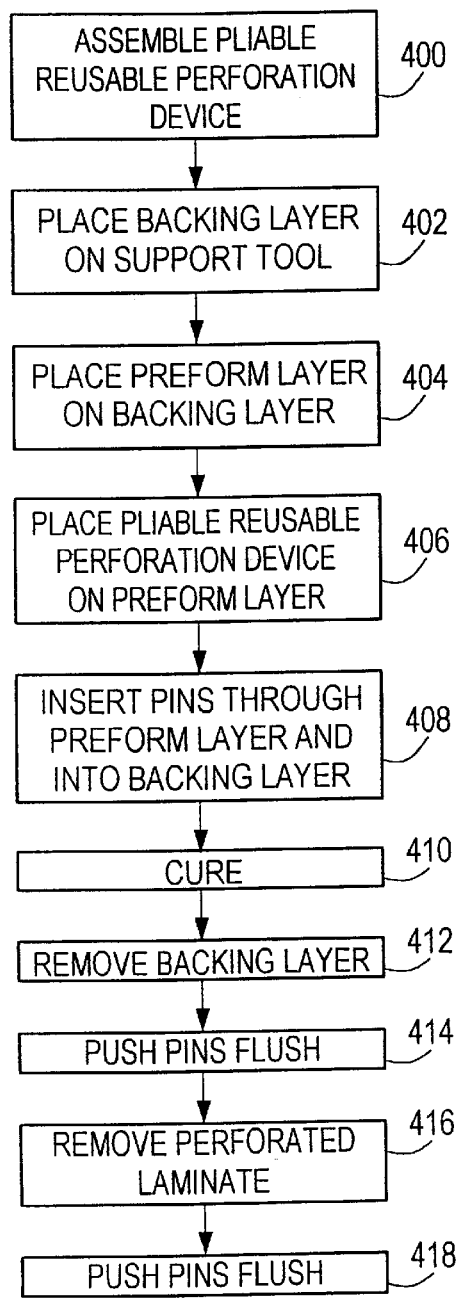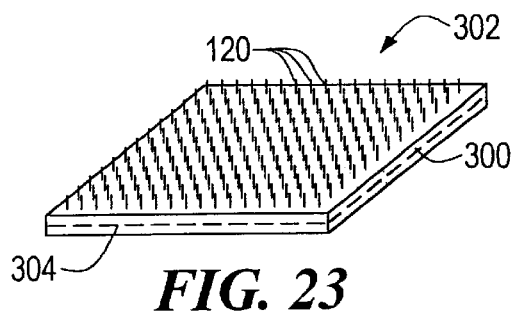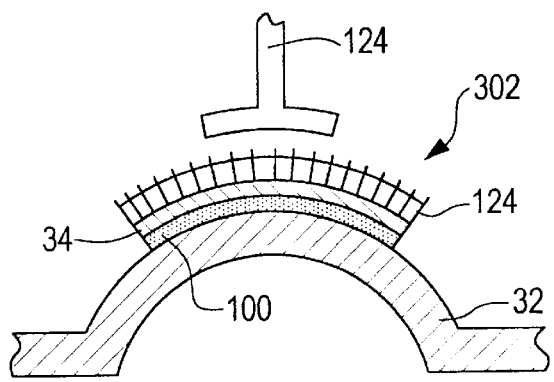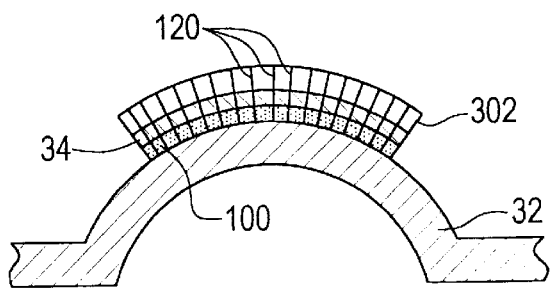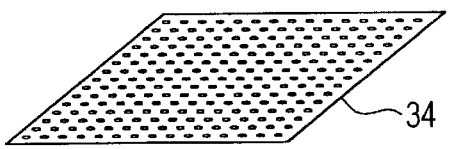

METHOD OF MANUFACTURING A PERFORATED LAMINATE

RELATED CASES

This application is a continuation-in-part of application Ser. No. 09/039,170, filed Mar. 13, 1998, now abandoned, entitled METHOD OF MANUFACTURING A PERFORATED LAMINATE, by Freitas et al.

FIELD OF INVENTION

This invention relates to a method of manufacturing a perforated laminate useful, for example, as a part of a Helmholtz resonator structure.

BACKGROUND OF INVENTION

Perforated laminate sheets are used in a variety of application including Helmholtz resonators which include a honeycomb core supporting a perforated laminate face sheet. Such structures are used to form the arcuate inner surfaces of the nose cowl and thrust reverser components of a nacelle system of a commercial jet aircraft.

Surprisingly, perforating a composite laminate is not a straight forward process. The problems with drilling, abrasion, stamping, water jet, laser beam, and other similar processes are documented in U.S. Pat. Nos. 5,268,055 and 5,252,279 incorporated herein by this reference.

So, these and other patents (e.g., U.S. Pat. Nos. 4,541,879; 4,390,584; 5,419,865; 4,612,737; and 4,486,372) delineate a different perforation methodology wherein a pin mat is used to perforate the composite laminate. The pin mat is formed from a plate with a number of interconnected, integral, upstanding pins or studs. A number of these pin mats are interlocked and a laminate, usually in the prepreg stage, is driven onto the pin mat using pressure or some kind of an impacting tool.

The primary limitation with this manufacturing method is the extremely high number of man hours required to fabricate the pin mats, assemble them on a forming tool, form the perforated composite laminate sheet, and to then re-work the perforations due to the fact that a number of pins usually break off from the pin mat during processing. Another limitation is that since the pins of the pin mat must be extracted from the perforated laminate in the same direction they were inserted, the pins must have a conical shape resulting in tapered perforations which are not as beneficial as straight perforations. Moreover, extruded pin mats, typically only available in 27"×43" sheets, require heat treating and theremoforming before use.

SUMMARY OF INVENTION

It is therefore an object of this invention to provide an improved method of manufacturing a perforated laminate.

It is a further object of this invention to provide such a method which dramatically reduces the number of man hours required to manufacture a perforate laminate.

It is a further object of this invention to provide such a method which requires little rework.

It is a further object of this invention to provide such a method which results in a higher quality perforated laminate.

It is a further object of this invention to provide such a method which results in a perforated laminate having perforations which are straight instead of tapered.

It is a further object of this invention to provide such a method which results in lower cost perforated laminate sheets useful in a variety of applications.

It is a further object of this invention to provide such a method which is easy to implement and simple to understand.

It is a further object of this invention to provide a perforated laminate sheet manufactured in accordance with the novel method of this invention.

This invention results from the realization that a higher quality and lower cost perforated laminate useful for Helmholtz resonator and other structures can be manufactured, not by using a pin mat and driving the laminate onto the pin mat, but instead by keeping the laminate stationary and then driving a number of discrete pins through the stationary laminate using discrete pins supported as they are driven into the laminate by, for example, a pliable body which is much easier to manipulate and conform to the contours of the resulting laminate than the prior art pin mats which are difficult to manufacture in the first place and also difficult to work with. By using the discrete pins instead of the pin mats, straight shaft pins can be used resulting in better formed perforations. In addition, the pins are easier to remove from the perforated laminate as compared to the broken off truncated, conical shaped pins of the prior art pin mat based manufacturing methods. Since the pin mat itself is eliminated in this invention, the problems and high number of man-hours associated with fabricating and forming the pin mats and orienting them on the forming tool are eliminated.

This invention features a method of making a perforated laminate, the method comprising assembling a pliable perforation device having a plurality of holes and a plurality of perforation pins in the holes on a laminate, driving the pins through the laminate to perforate the laminate, and removing the pins from the laminate.

The perforation device typically includes a body of cured silicone material and may have one or more layers of laminate material. The pins are preferably sharpened on at least one end.

An ultrasonic horn may be used to engage a number of the perforation pins and drive them in unison into the laminate.

The laminate is typically a prepreg material and the method further includes the step of staging or curing the laminate after the pins are driven through the laminate but before the pins are removed from the laminate. To drive the pins through the laminate, the laminate is placed on a backing material which resides on a support tool. The support tool may be curved.

Removing the pins may include removing the backing layer from the laminate and pushing the pins flush with one surface of the laminate and back through the holes in the perforation device. The perforation device is then stripped away from the perforated component. Then, the pins may be pushed flush with one surface of the perforation device in order to reuse the perforation device.

This invention also features a perforated laminate made in accordance with this method.

This invention further features a reusable perforation device for making a perforating laminate, the perforation device comprising a pliable body including a plurality of holes therethrough, and a plurality of perforation pins positioned in the holes of the pliable body along at least a portion of their lengths, the pins extending above one surface of the pliable body.

The pliable body preferably has a bending strength much less than its compressive strength. The pliable body may include a sheet of cured silicone material and may include one or more layers of laminate material.

DISCLOSURE OF PREFERRED EMBODIMENT

Other objects, features and advantages will occur to those skilled in the art from the following description of a preferred embodiment and the accompanying drawings, in which:

FIG. 10 is a flow chart showing the primary manufacturing steps in accordance with the subject invention;

FIG. 11 is a schematic end view of the receiving material used in accordance with the method of the subject invention in place on a lay-up tool;

FIG. 12 is a more detailed flow chart of the pin insertion manufacturing steps of the method of this invention;

FIG. 13 is a schematic end view of the primary components used in the pin insertion steps of this invention in accordance with the flow chart of FIG. 12;

FIG. 22 is a flow chart depicting the primary manufacturing steps associated with another embodiment of making a perforated laminate in accordance with this invention;

FIG. 23 is a schematic view of the perforation device of this invention used to form a perforated laminate;

FIG. 24 is a front sectional view of the perforation device shown in FIG. 23 in place on a laminate on a support tool;

FIG. 25 is a front sectional view of the perforation device shown in FIG. 23 after the pins thereof are driven through laminate to perforate the laminate; and FIG. 26 is a schematic view of a perforated laminate manufactured using the perforation device of this invention.

Figure 1:
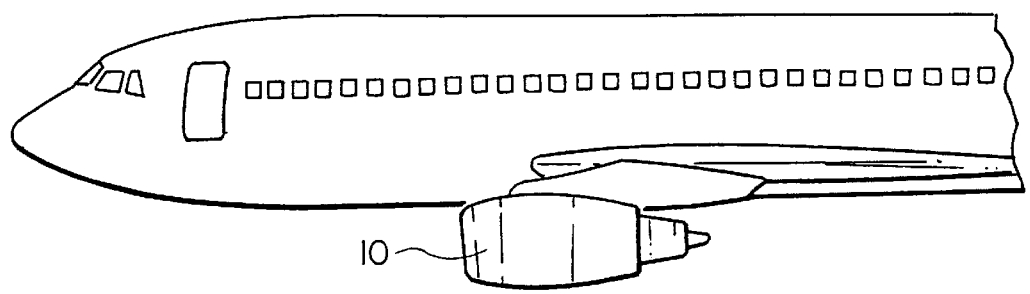
FIG. 1 is a partial view of an aircraft having a nacelle that utilizes sound attenuation structures having perforated laminates manufactured in accordance with the subject invention.
Figure 2:
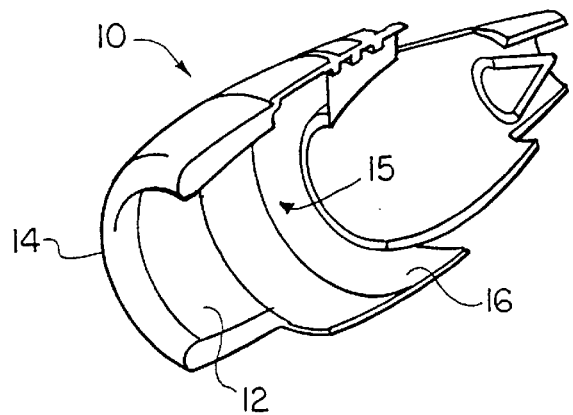
FIG. 2 is a partial cutaway perspective view of a portion of the nacelle shown in FIG. 1 and illustrates the typical arcuate acoustic structures which utilize a perforated laminate manufactured in accordance with the subject invention.

As discussed in the background of the invention above, perforated laminate sheets are useful as parts of acoustic structures, for example, panels of nacelle 10, FIG. 1 of a commercial jet aircraft. The arcuate inner surface 12, FIG. 2, of nose cowl 14 and the arcuate inner surface 15 of thrust reverser 16, for example, are formed of acoustic structure 20, FIG. 3 which includes perforated laminate sheet 34 supported by honeycomb core 22. Such a structure is often referred to as a Helmholtz resonator.

Figure 3:
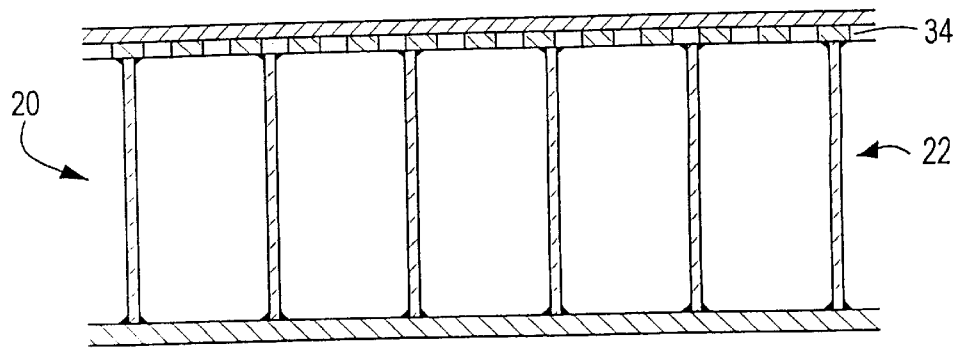
FIG. 3 is a sectional side view of a Helmholtz resonator sound attenuation structure incorporating a perforated laminate sheet in accordance with the subject invention.
Figures 4A, 4B:
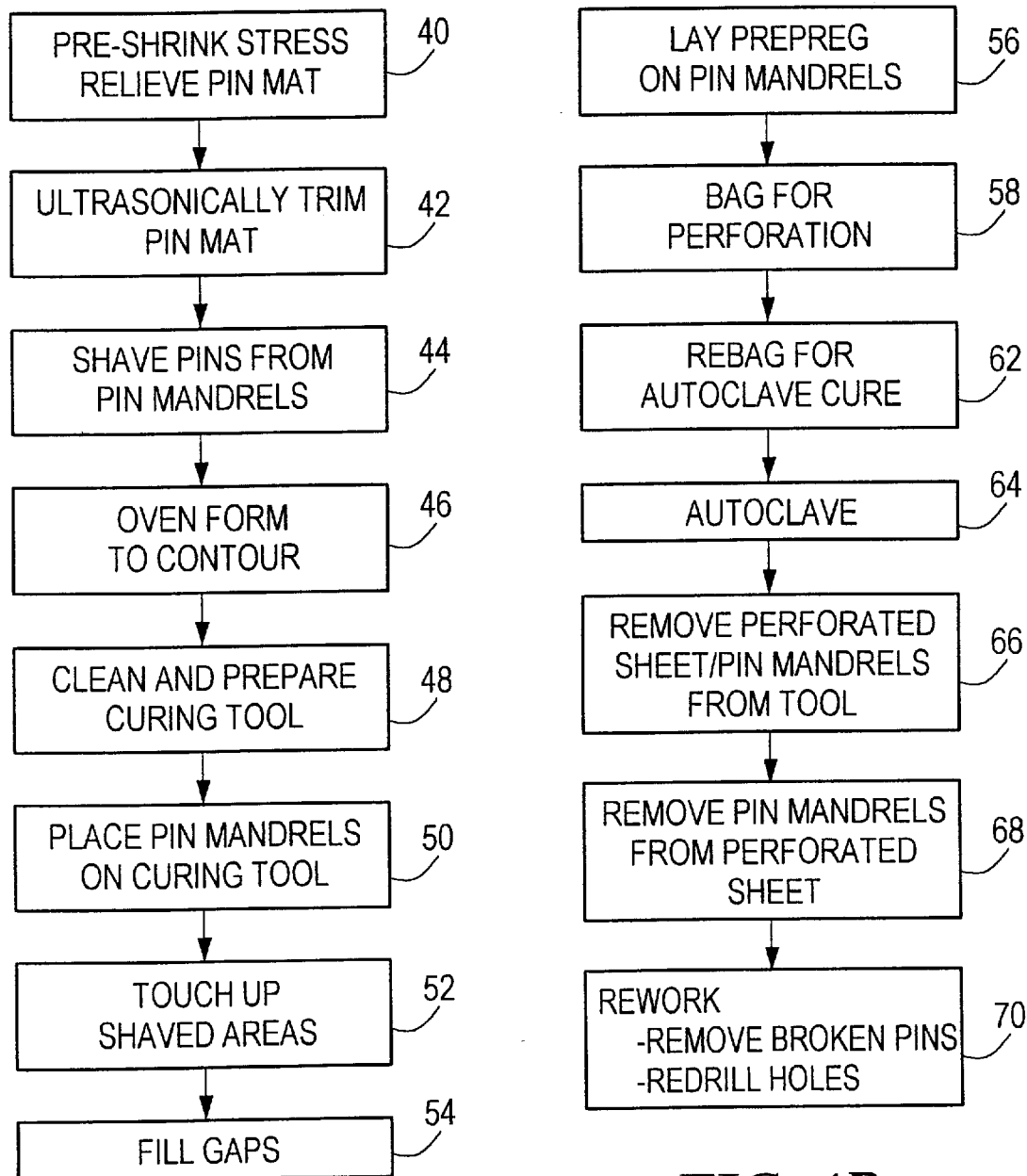
FIGS. 4A and 4B are flow charts depicting the primary manufacturing steps of the prior art methods of making a perforated laminate using pin mats.
Figure 5:
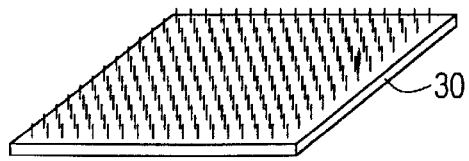
FIG. 5 is a schematic view of a prior art pin mat.
Figure 6:
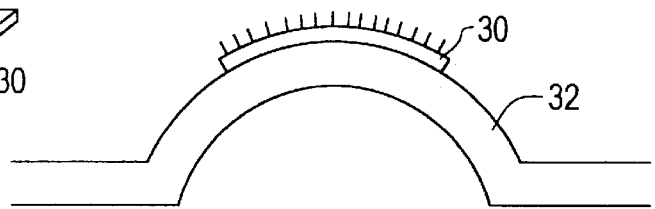
FIG. 6 is a schematic end view of the pin mat shown in FIG. 5 placed on a layup tool in accordance with the prior art.
Figure 7:
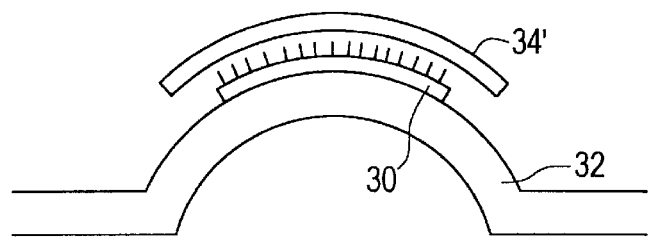
FIG. 7 is a schematic end view of a prior art manufacturing step wherein a prepreg laminate is driven onto a pin mat in accordance with the prior art.

The prior art method of manufacturing perforated sheet 34, FIG. 3, is shown in FIGS. 4–7. Pin mat 30, FIG. 5 is fabricated and then preshrunk and stress relieved, step 40, FIG. 4A. Next, pin mat 30 is ultrasonically trimmed, step 42 and the pins are then shaved from the pin mandrels, step 44. This structure is then contoured by oven forming, step 46. Curing tool 32, FIG. 6, is then cleaned and prepared, step 48, FIG. 4A and the pin mandrels are placed on the curing tool, step 50 as shown in FIG. 6. The shaved areas are touched up, step 52, and the gaps between adjacent mandrels are filled, step 54. Prepreg layer 34', FIG. 7, which will eventually become perforated layer 34, FIG. 3, is then placed on pin mandrel 30, FIG. 7, step 56, FIG. 4B. This assembly is then bagged and perforated. This structure is then re-bagged to cure perforated prepreg 34', step 62, FIG. 4B, in an autoclave, step 64. The combination of cured, perforated prepreg layer 34 and pin mat 30 is then removed from forming tool 32, FIG. 7, step 66, FIG. 4B. The pin mats 30, FIG. 7, are then removed from the cured perforated pre-form 34', step 68, FIG. 4B.

At this stage, a serious amount of re-work is required, step 70. Many pins, broken off pin mat 30, FIG. 7, will reside in the perforations of the perforated sheet and these broken pins must be removed. In addition, a number of the perforations must be re-drilled.

Figure 8:
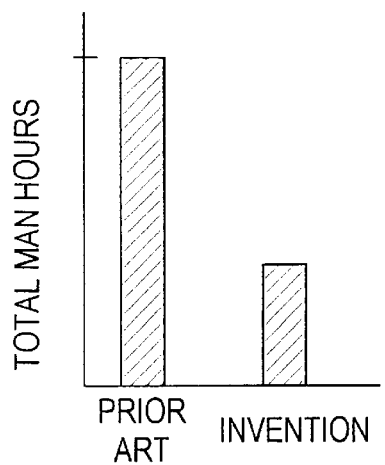
FIG. 8 is a graphical depiction comparing the total number of man hours required to manufacture a perforated laminate using the prior art methods to the method of the present invention.

The above process is currently carried out in order to make the perforated sheets for the inner linings of nacelle structures. Re-work step 70, FIG. 4B alone can require many man hours and the total man hours from step 40, FIG. 4A through step 70, FIG. 4B, can be excessive. See FIGS. 8 and 9.

In the subject invention, however, the pin mats are eliminated and thus the total number of man hours is dramatically reduced. In addition, almost no re-work is required. First, receiving material 100, FIG. 11, is placed on lay-up forming tool 32, step 102, FIG. 10. Receiving material 100, FIG. 11, may, for example, be a layer of foam or rubber. The prepreg layer which will ultimately become the perforated sheet is then placed over receiving material 100, step 104, FIG. 6 and held stationary thereon. See also FIG. 13. A set of discrete pins are then driven through the prepreg layer and into receiving material 100, step 106, FIG. 10, as discussed in more detail with reference to FIG. 13. A silicone layer is then placed on the pins and the structure is placed in an autoclave to stage, or completely cure the now perforated prepreg in an autoclave bag, step 108, FIG. 10. Finally, the discrete pins are removed, step 110 as discussed in more detail with reference to FIGS. 14 and 15.

One method of inserting the pins through the prepreg layer and into the receiving material, step 106, FIG. 10, is discussed with reference to FIGS. 12 and 13. In step 150, FIG. 12, a plurality of discrete pins 120 are initially inserted into a compressible body, for example foam layer 122, FIG. 13 forming foam layer/pin combination 124. Foam layer/pin combination 124 is then placed on prepreg layer 34, FIG. 13, step 152, FIG. 12. Ultrasonic horn 124, FIG. 13 is then used to ultrasonically drive pins 120 through prepreg layer 34 and into receiving layer 100, step 154, FIG. 12. Other oscillating, vibratory impacting devices may also be used to drive pins 120 into the laminate to perforate it. See, e.g., U.S. Pat. No. 5,268,055.

In an alternative embodiment, pins 120 are driven directly through prepreg layer 34 and into receiving layer 100 using, for example, an numerical control machine.

Figure 14:
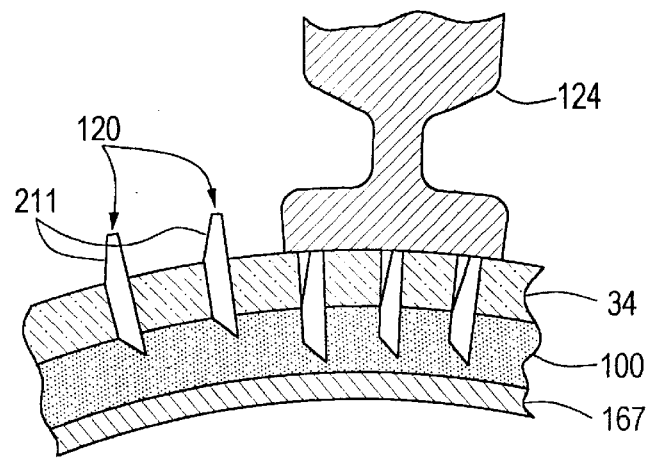
FIG. 14 is a schematic view depicting the primary steps involved in removing the pins from a partially or completely cured perforated laminate in accordance with the subject invention.
Figure 15:
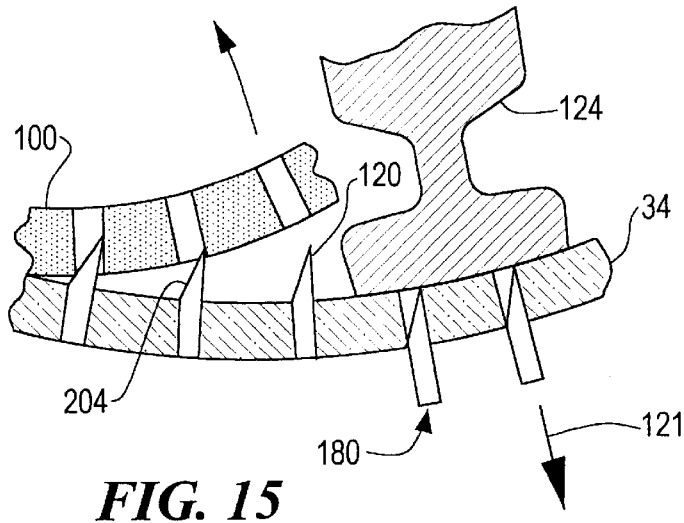
FIG. 15 is a schematic view showing the primary steps involved in an alternative way of removing the pins from a partially or completely cured perforated laminate in accordance with the subject invention.

In any case, once these pins are driven through the prepreg layer 34 and into receiving layer 100, and after the prepreg layer is staged or cured, step 108, FIG. 10, the pins must be removed in accordance with the processing steps shown in FIGS. 14 and 15.

In one example pins 120, FIG. 14 which have been previously inserted through laminate 34 into foam receptor layer 100 and after laminate 34 is then cured, are removed by driving them flush with laminate 34 and further into foam receptor layer 100 which rests on tool 167 using vibrating horn 124. Taper 211 on pins 120 permits easy removal of the laminate from the pins once the pins are driven flush.

In another example, laminate 34, FIG. 15 and foam receptor layer 100 have been removed from the curing tool and inverted. Foam 100 is then peeled away exposing the pointed ends of pins 120. Vibrating horn 124 is then used to drive pins 120 flush with the laminate. Taper 204, which previously aided insertion of the pins, is now used to aid their release from the laminate once they are driven flush. The pins either fall out in the direction shown by arrow 121 or they can be easily pulled out of laminate 34.

Figure 9:
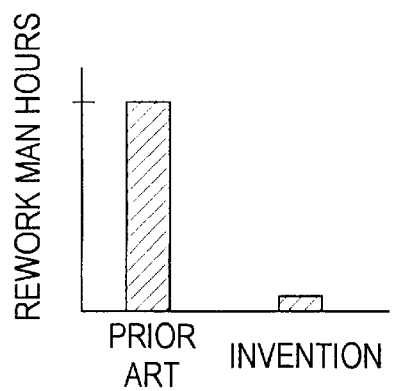
FIG. 9 is a graphical depiction comparing the number of rework man hours using the prior art pin mat manufacturing based methods to the method of the subject invention.

The result of using this method is a dramatic decrease (more than 30%) in the total number of man hours and hence the expense of manufacturing acoustic panels. In accordance with the prior art, re-work step 70, FIG. 4B, alone took many hours. In accordance with the subject invention, however, re-work, if any, is minimal as shown in FIG. 9. One reason for the reduction in the number of man hours when the method of this invention is used is the elimination of the pin mats which must be fabricated, formed, trimmed, and then assembled on a forming tool.

Figure 19:
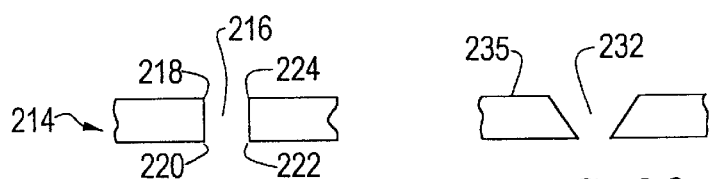
FIG. 19 is a schematic sectional view showing the details of the improved square hole perforation achievable in accordance with the method of this invention.

In addition, the manufacturing process of the subject invention produces higher quality laminated perforated sheets to be used in acoustic panels. The discrete pins 120, FIG. 9, used are straight along the majority of their shaft length as shown at 200, FIG. 16, and 202, FIG. 17. In the example shown in FIG. 16, the pins are sharpened to a point 204 with one angled face 206, while for the pin shown in FIG. 17, the pins are sharpened to a point 208 with two angled faces 210 and 212. Point 211 is formed in a similar fashion to aid in removing the pin after it is driven into the laminate. The result is perforated sheet 214, FIG. 19 with perforation 216 having sharp corners 218, 220, 222, and 224. These sharp corners are preferred because of their sound attenuation characteristics.

Figure 18:
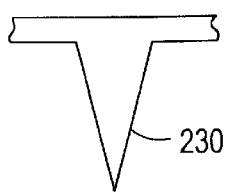
FIG. 18 is a view of a prior art pin of a pin mat in accordance with the prior art.
Figure 20:
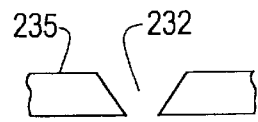
FIG. 20 is a schematic sectional view of a prior art conical shaped hole formed by using a pin mat.

In contrast, using prior art pin mat 30, FIG. 5 with interconnected tapered conical shaped pins such as the pin shown at 230, FIG. 18, a tapered perforation is formed as shown at 232, FIG. 20 in perforated sheet 235. This tapered perforation exhibits less than desirable sound attenuation qualities.

Figure 21:
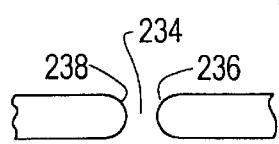
FIG. 21 is a schematic sectional view of a prior art perforation made in accordance with drilling or blasting operations.

Other prior art methods of forming perforations including sand blasting and laser drilling to form the perforations such as perforation 234, FIG. 21 having rounded sides 236 and 238 which also exhibit poor sound attenuation characteristics.

Thus, the method of this invention provides a higher quality perforated laminate, severely reduces the number of man hours required to manufacture a perforate laminate, involves almost no rework, results in lower cost perforated laminate sheets useful in a variety of applications, and is easy to implement and simple to understand.

With this invention, a higher quality and lower cost perforated laminate useful for Helmholtz resonator and other structures is manufactured, not by using a pin mat and driving the laminate onto the pin mat in accordance with the prior art, but instead by keeping the laminate stationary on lay-up tool 32, FIG. 13 and then driving a number of discrete pins through the stationary laminate. The discrete pins may be supported as they are driven into the laminate by, for example, foam body 122 which is much easier to manipulate and conform to the contours of the resulting laminate and the forming tool as compared to prior rigid art pin mat 30, FIG. 5 which is difficult to manufacture in the first place and also difficult to work with. By using discrete pins 120, FIG. 13 instead of pin mat 30, FIG. 5, non-conical shaped pins can be used and the pins are easier to remove from the perforated laminate as compared to the broken off conical pins of the prior art pin mat based manufacturing methods. And, the shape of the resulting perforations (see, e.g., FIG. 19) is improved since the discrete pins used in accordance with the manufacturing method of this invention are not constrained to be of a conical shape.

Because the pins used in accordance with this invention are discrete and integrated and not part of a pin mat, the steps of manufacturing the pin mats, forming the pin mandrels, orienting the pin mandrels on the forming tool, and removing the broken pins from the laminate of the prior art are eliminated (e.g. steps 40–54, FIG. 4A and steps 66–70, FIG. 4B). This improvement alone saves hundreds of man hours. See FIGS. 8 and 9. For an example of the complexity of forming and assembling the pin mat mandrels of the prior art see U.S. Pat. No. 5,252,279, col. 8, line 3- col. 9, line 7. Conformable foam body 122, FIG. 13 is much easier to work with and thus results in a dramatic cost savings over prior art pin mat based methods.

In this invention the composition of foam body 124, pins 120, FIG. 13 and the operation of steps 150–154, FIG. 12 are set forth in U.S. Pat. No. 5,589,015 incorporated herein by this reference. Receiving layer 100, FIG. 11 may be the same material as foam body 124. See also U.S. Pat. Nos. 4,808, 461; 5,466,506, and U.S. application Ser. No. 08/545,392 filed Oct. 19, 1995 (now allowed) also incorporated herein by this reference.

In another embodiment, pins 120, FIG. 23 are inserted into pliable sheet 300 by hand, by using a numerical control machine, or by using foam/pin combination 124, FIG. 13 and an ultrasonic horn.

Pliable sheet 300 may be an uncured silicone layer at this stage which is later cured after pins 120 are inserted therethrough resulting in pliable "perforation device" 302 in accordance with this invention. Other rubbery materials may be used for pliable sheet 300 but in general the material used should be pliable having a bending strength much less than its compressive strength.

The low bending strength of perforation device 302 allows it to be shaped either before or after curing to follow the contours of the laminate to be perforated and the much greater compressive strength and resilience (typically greater than foam) allows perforation device 302 to be reused.

To adjust the bending strength, one or more layers of laminate 304 (e.g. fibers in a resin matrix) may be included within perforation device 302 which may in addition include laminate facing sheets (not shown) on the top and bottom surfaces thereof.

Once fabricated, perforation device 302 has a plurality of holes formed when pins 120 were inserted therein and pins 120 now reside in the holes. Finger pressure is generally required to push a single pin in and out and a pressure greater than that is generally required to move a group of pins at once.

Thus, the pliable nature of sheet 300 holds the pins in place in the holes but upon the application of sufficient pressure they can be reciprocated back and forth in the holes and from one side of the sheet to the other.

In order to form a perforated panel, perforation device 302, FIG. 23 is assembled as discussed above, step 400, FIG. 22. A backing layer 100 is then placed on tool 32, FIG. 24 similar to FIG. 11, step 402, FIG. 22. Prepreg layer 34, FIG. 24 is then placed on backing layer 100, step 404, FIG. 22. As shown in FIG. 24, perforation device 302 is then placed on prepreg layer 34, step 406, FIG. 22 and ultrasonic horn 124 is used to drive the pins 120 through prepreg layer 34 and into backing layer 100, step 408, FIG. 22. See also, FIG. 25.

The combination of prepreg layer 34, backing layer 100, and perforation device 302 is then subjected to a conventional curing operation to cure and consolidate prepreg layer 34 to form a laminate, step 410, FIG. 22. Alternatively, the laminate may be staged.

Backing layer 100 can then be pealed off cured structure 34, step 412, FIG. 22, and the pins of perforation device 302 pushed flush against cured structure 34, step 414, FIG. 22, for example, by using ultrasonic horn 124, FIG. 24.

Figure 16:
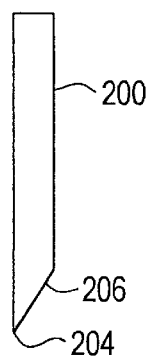
FIG. 16 is a schematic view of one discrete pin used in the method of the subject invention.
Figure 17:
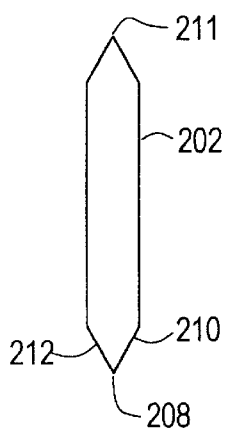
FIG. 17 is a schematic view of another type of discrete pin useful in accordance with the method of this invention.

The taper of the pins (see FIGS. 16–17) now allows the cured perforated structure 34, FIG. 26 to be removed from perforation device 302, step 416, FIG. 22. Pins 120 may be sharpened on one or both ends, as shown in FIGS. 16 through 17.

In the final step, the pins of perforation device 302 are reset for reuse by pushing them flush with one surface of perforation device 302. This can be accomplished by a roller or again by using ultrasonic horn 124, FIG. 24.

The reusable nature of perforation device 302, FIG. 23 offers a significant cost savings benefit over prior art pin mat 30, FIG. 5 which typically cannot be used more than once since a number of pins tend to break off during processing. Moreover, as with the other embodiments described above, reusable perforation device 302 greatly reduces the man hours associated with forming perforated panels. See FIGS. 8 and 9.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method of making a perforated laminate, the method comprising:

assembling a pliable perforation device having a plurality of holes and a plurality of discrete perforation pins slidably disposed in the holes thereof;

placing the perforation device on a laminate to be perforated;

driving the pins through the laminate while sliding the in the holes to perforate the laminate; and removing the pins from the laminate.

2. The method of claim 1 in which the perforation device includes a body of cured silicone material.

3. The method of claim 2 in which the body of silicone material includes one or more layers of laminate material.

4. The method of claim 1 in which the pins are sharpened on at least one end.

5. The method of claim 1 in which the step of driving includes using an ultrasonic horn and engaging the ultrasonic horn with a number of the perforation pins.

6. The method of claim 1 in which the laminate is a prepreg material and the method further includes the step of staging or curing the laminate after the pins are driven through the laminate but before the pins are removed from the laminate.

7. The method of claim 1 further including placing the laminate on a backing material before the pins are driven through the laminate.

8. The method of claim 7 further including the step of placing the backing layer on a support tool.

9. The method of claim 8 in which said support tool is curved.

10. The method of claim 7 in which the step of removing the pins includes removing the backing layer from the laminate and pushing pins flush with one surface of the laminate and back through the holes in the perforation device.

11. The method of claim 1 further including the step of pushing the pins flush with one surface of the perforation device in order to reuse the perforation device.

12. A method of making a perforated laminate using a pliable perforation device having a plurality of holes and a plurality of discrete perforation pins slidably disposed in the holes thereof, the pins slidable in one direction through the holes to perforate the laminate and back through the holes to allow the perforation device to be reused, the method comprising:

placing a perforation device on a laminate to be perforated driving the pins through the laminate, to perforate the laminate while sliding the pins in the one direction through the holes;

pushing the pins back through the holes in the perforation device until the pins are flush with one surface of the laminate;

separating the laminate from the perforation device; and pushing the pins further back through the holes until the pins are flush with one surface of the perforation device in order to reuse the perforation device.

* * * * *